United States Patent Office 3,509,021
Patented Apr. 28, 1970

3,509,021
POLYACRYLAMIDE-AMINOPLAST RESIN COMPOSITIONS AND THEIR USES
Fred E. Woodward, Watchung, N.J., assignor to Diamond Shamrock Corporation, a corporation of Delaware
No Drawing. Filed Mar. 20, 1967, Ser. No. 624,154
Int. Cl. D21d *3/00;* D21h *3/54;* C08g *37/32*
U.S. Cl. 162—167                3 Claims

ABSTRACT OF THE DISCLOSURE

Mixtures of polyacrylamide and aminoplast resin in a weight ratio of from 1:9 to 9:1 are used as flocculant compositions to separate finely divided solids from aqueous systems. These mixtures are also used as pigment retention aids and dry strength agents in the manufacture of paper.

---

This invention relates to resin compositions and their use and more particularly to compositions which are mixtures of polyacrylamide and particular aminoplast resins and use of these compositions in flocculating finely divided solids and in paper making.

Polyacrylamide has been used as a flocculant to separate finely divided solids from aqueous systems such as dispersions, suspensions, slurries and the like in widely diverse industries such as mineral dressing, paper making, chemical processing, sewage treatment, water clarification and the like. This material causes agglomeration or aggregation of finely suspended solids present in the aqueous system. The resulting agglomerates or aggregates then separte from the aqueous phase and are removed by sedimentation or filtration. Although polyacrylamide has found application as a flocculant in numerous industries, it is not effective in many applications. In some applications, it fails to flocculate or agglomerate a portion of the finely divided suspended solids present in the aqueous dispersion so that the supernatant liquid in the aqueous phase after flocculation remains cloudy. In other applications, it does not provide satisfactory flocculation or sedimentation rates and it is necessary to find ways to increase the rate of flocculation or sedimentation.

It is an object of the present invention to provide resin compositions. Another object of the present invention is to provide processes using these compositions for flocculating dispersions of finely divided suspended solids in aqueous systems such as dispersions, suspensions, slurries and the like. Still another object is to provide for processes using these compositions in paper making as dry strength agents and pigment retention aids. Other objects of this invention will become apparent from the detailed description given hereinafter. It is intended however, that the detailed description and specific examples do not limit this invention but merely indicate preferred embodiments thereof since various changes and modifications will become apparent to those skilled in the art.

The above objects and other objects of the present invention have been achieved by my discovery of a class of resin compositions which are mixtures of water soluble polyacrylamide and particular water soluble aminoplast resins and the utilization of these compositions in the flocculation of aqueous systems such as dispersions, suspensions, slurries or the like of suspended solids and in paper making as dry strength agents and pigment retention aids. I have found a class of resin compositions which are mixtures containing (A) from about one part by weight to about nine parts by weight of water soluble polyacrylamide, and (B) from about one part by weight to about nine parts by weight of a water soluble aminoplast resin which is (1) the reaction product of about one mole of dicyandiamide, about three moles of formaldehyde and from about 0.5 mole to about one mole of urea per mole of dicyandiamide produced by (a) mixing the dicyandiamide and formaldehyde in an aqueous medium with a catalytic amount of an acid catalyst which is a saturated aliphatic water soluble mono- or poly-carboxylic acid or a saturated aliphatic water soluble hydroxy mono- or poly-carboxylic acid, or mixtures thereof, (b) condensing the dicyandiamide and formaldehyde at about reflux temperature to obtain a condensate, (c) reacting the resulting condensate with urea at about reflux temperature to obtain the reaction product, (d) cooling the resulting reaction product to about 40° C., and (e) stabilizing the reaction product at about 40° C. with methanol, or (2) the reaction product of about 0.9 mole of dicyandiamide, about 0.1 mole of melamine, about three moles of formaldehyde and from about 0.5 mole to about one mole of urea per mole of dicyandiamide and melamine produced by (a) mixing the dicyandiamide, melamine and formaldehyde in an aqueous medium with a catalytic amount of an acid catalyst which is a saturated aliphatic water soluble mono- or poly-carboxylic acid or a saturated aliphatic water soluble hydroxy mono- or poly-carboxylic acid or mixtures thereof, (b) condensing the dicyandiamide, melamine and formaldehyde at about reflux temperature to obtain a condensate, (c) reacting the resulting condensate with said urea at about reflux temperature to obtain the reaction product, (d) cooling the resulting reaction product at about 40° C., and (e) stabilizing the reaction product at about 40° C. with methanol.

Further, I have discovered that these compositions exert a synergistic effect, that is, the compositions are more effective flocculants than either of the individual components. This discovery of synergism was quite unexpected because of the flocculating properties of the mixtures could not be predicted on the basis of the flocculating properties of the individual components alone. Although it was known that water soluble polyacrylamide as well as water soluble aminoplast resins exhibit flocculating properties, the outstanding flocculating properties of their mixtures could not be predicted on the basis of chemical structures, chemical properties or other considerations. Not only do polyacrylamide and aminoplast resin contain similar cationic groups, but polyacrylamide and aminoplast resins are present in the mixtures as individual components, i.e., the components are not inter-reacted. Consequently, there was no basis on which the synergism of the mixtures could be predicted on the basis of the known flocculating properties of the individual components. Further, I have found that neither the amino bases used in the preparation of these aminoplast resins nor compositions of the amino bases with polyacrylamide are effective as flocculants. By amino bases, I mean the unmodified amino bases such as dicyandiamide, melamine and urea. I have also found the polyacrylamide-aminoplast resin compositions are useful in paper making as dry strength agents and pigment retention aids.

I have found that these compositions are highly effective flocculants in processes where a flocculating amount of the composition is added to an aqueous system containing suspended solids. By flocculating amount is meant that quantity of a composition of the present invention, which when added to a dispersion, suspension or slurry of suspended solids in an aqueous system is sufficient to flocculate or coagulate the suspended solids. The quantity of composition required to flocculate the suspended solids present in the aqueous system is determined in part by the nature of the solids, particle size of the solids, impurities or contaminants present in the suspended solids, presence and nature of inert solids in the aqueous system, the quantity of solids present in the aqueous system and other factors. From about 0.1 p.p.m. to about 10 p.p.m. of composition is usually adequate to flocculate, precipitate or coagulate the suspended solids present in an aqueous system. The solids content of the aqueous system will vary from about 0.01% by weight to about 30% by weight of the total weight of the aqueous system.

To achieve optimum efficiency with the compositions of the present invention, the flocculant should be uniformly distributed throughout the aqueous system. Uniform distribution of the flocculant in the aqueous system is usually accomplished by use of as dilute a solution of the flocculant as practical without causing over dilution of the system being treated. However, the composition can be added in solid form or as a concentrated solution provided uniform distribution of the flocculant in the aqueous system is obtained. The composition is added to the aqueous system in a manner which assures uniform distribution. For example, a dilute solution of the composition can be added to the system and the resulting mixture vigorously agitated to obtain uniform distribution of the composition. The composition can be added to the system while the system is being circulated during processing. After the composition has been uniformly mixed in the aqueous system, agglomeration or aggregation of suspended solids present in the system occurs. The resulting agglomerates or aggregates then separate from the aqueous phase and are removed by sedimentation, filtration or the like.

The compositions of the present invention can be used in aqueous systems at any temperature above the freezing point of the liquid to any temperature up to the boiling point of the liquid. If desired, the composition can be used at temperatures above the boiling point of the aqueous system provided that the process is carried out under sufficient pressure to maintain water present in the aqueous system in the liquid phase. The compositions are usually used in aqueous systems having temperatures of from about 50° F. to about 110° F.

The compositions can be used for flocculating and coagulating a large variety of suspended solid materials from aqueous systems such as dispersions, suspensions, slurries and the like. They can be used as the only flocculant or may be used in conjunction with conventional flocculants such as alums, aluminum sulfate, calcium chloride, lime, iron salts, glues, gelatins, starches, cellulose derivatives and the like. The compositions can be used to clarify water for domestic and industrial purposes; in flocculating, settling, thickening and dewatering processes used in the floatation, concentration and tailings of minerals; in processing of liquors from leaching of mineral or ore materials with water or with solutions of acids, alkalies, cyanides and the like; in removal of chemical precipitates from water such as those which are finely dispersed in soluble calcium, magnesium and uranium salts; in processing of various industrial aqueous waste including those from electroplating, paper making, paper processing, deinking, tanning, food and textile products also in processing of mine wastes and effluents from washeries and plants treating sand, gravel, cement materials, iron ores, coal, uranium and phosphate rock, textile waste, domestic and industrial sewage, foundry waste as well as suspensions occurring in the processing of various industrial clays, fillers, coating material, asbestos, metal oxides, pigments and the like. These compositions are particularly useful for settling and filtration of mineral suspensions containing finely divided predominantly nonarguillaceous materials.

The compositions of this invention improve sedimentation and filtration rates when the above aqueous systems are dewatered by sedimentation or filtration methods. In addition, handling of sedimentation and filtration by-products such as filter cakes and dewatered products is greatly improved in that the by-products are more concentrated and can be readily removed from the equipment.

These compositions are particularly useful for processing minerals in aqueous systems. Certain minerals, particularly elastic or sedimentary types, contain fragments or sand particles united by cementitious material. Upon comminution of the ore of the mineral in dressing operations, a large quantity of cementitious material is reduced to a pulverulent state which effectively strips it from the sand particles. Addition of water to the comminuted mass forms a slime of the pulverulent material. After still further additions of water, the slime assumes the characteristics of a colloidal suspension. The comminuted mass after water addition becomes an aqueous system containing slime and sand. Coexistence of slime and sand impedes filtration.

In gravity filtration, the sand settles rapidly from the system to form a sand layer. The slime then slowly settles on the upper surface of the sand layer, clogs the pores and hinders fluid flow through the sand layer. When the filtration is being carried out in a drum or disc filter, the settled slime impedes or halts flow of fluids through the sand layer in the filter sector and as the supernatant liquid is drawn off, the suspended slime clogs the pores in the sand layer making continuous filtration difficult, if not impossible. Addition of the compositions of the present invention to aqueous systems containing slime and sand causes the slime particles to aggregate or agglomerate so that they become larger particles. The larger particles settle rapidly and do not form an impervious layer on the upper surface of the sand layer which impedes fluid flow. Consequently, aqueous mineral wastes treated with these compositions can be dewatered more rapidly and more satisfactorily.

As examples of solid materials which can be flocculated or coagulated by the compositions of the present invention, there can be mentioned phosphate rock, basic titanium dioxide, kaolin, montmorillonite, and illite or hydromica groups, halloysite, limonite, dolomite, pulverized shale, asbestos, calcium carbonate, sodium chloride, iron sulfate, aluminum sulfate, sodium carbonate, sodium bicarbonate, other oxides, salts, clays and the like as well as by-products, residues and the like from chemical processing, paper making, hydraulic mining and the like. Suitable solids include clays such as kaolinite, bentonites, that is, sodium, potassium, lithium, calcium or other bentonites, attapulgite, hectorite, montronite, beidellite, saponite, nacrite, fuller's earth, anauxite, dickite, sericite and the like. These solids are in the form of aqueous suspensions, dispersions, slurries or the like.

The compositions of the present invention have other advangtaes. They are useful over a wide pH range and give good results over the entire pH range utilized in mineral recovery operations. They also give good flocculation, settling and/or filtration rates with or without the addition of electrolytes. In commercial mineral recovery operations, soluble electrolytes are often present in the mineral and additional electrolytes may have been added.

These compositions are also useful in the flocculation of solids such as organic polymeric materials suspended in aqueous systems. They can be used to flocculate natural rubber, synthetic rubber, other natural resins and polymers as well as other synthetic resins and polymers. These polymers are often employed in latex or emulsion forms in paper making, textile operations and the like and large quantities of water are contaminated with the polymers. Such water must be clarified and purified by flocculation and/or coagulation of suspended polymers before the water can be discharged as effluent or reused. The compositions are also useful as flocculants to precipitate fillers and fines in save-alls and clarifiers in paper making. Such fillers and fines can be recovered from water use in paper making processes.

The compositions of the present invention find other uses in paper making. They can be used in the production of paper such as bond paper, liner paperboard, bleached paperboard, offset paper, mimeograph paper, or the like. By the term "paper" is meant both paper and paperboard. These compositions are particularly useful as dry strength agents and pigment retention aids in paper making. From about 0.25 part by weight to about 10 parts by weight of the compositions dry are usually added to 2000 parts by weight of paper pulp based on dry fiber weight. The compositions are added to the pulp stock. The compositions can be added in concentrated or dry form provided they mix uniformly with the pulp in a relatively short time. When rapid mixing of the compositions with the pulp is desired, the compositions can be diluted to obtain solutions containing less than 5.0% solids. The compositions are usually added after refining and after alum addition in the paper making process. The compositions are useful in increasing the dry strength in both sulfite and kraft paper as well as paperboards. They are also useful in increasing pigment retention when filler pigments such as titanium dioxide and clays used in the paper making processes. Improved pigment retention results in an increase in the percent of ash in the paper, that is, the greater the percent of ash found in the paper, the greater the pigment retention.

Preparation of compositions

The compositions of the present invention contain from about 1 part to about 9 parts by weight of polyacrylamide solids and from about 1 part to about 9 parts by weight of aminoplast resin solids. By the term solids is meant the quantity of the particular component present in the mixture. If 10 parts by weight of polyacrylamide solution containing 10% solids are present in the composition, the composition contains 1 part by weight of polyacrylamide solids. The compositions are prepared by mixing the desired proportions of water soluble polyacrylamide and water soluble aminoplast resin until a uniform composition is obtained. Since the compositions are synergistic mixtures of the two components, the components should be mixed and the resulting mixtures stored under conditions wherein little if any reaction of the components of their mixtures occurs. When the components are prepared and mixed in accordance with the procedures given herein, satisfactory results are obtained when the components are mixed and the resulting compositions are mixed and stored at temperatures below about 45° C. It is usually not necessary to take additional precautions when temperatures below about 45° C. are used during mixing and storage.

A convenient procedure for preparing the compositions is to mix the required quantities of aqueous polyacrylamide solution and aqueous aminoplast resin solution at a temperature below 45° C. and above the freezing point of the composition. The resulting product is usually a solution in the form of a clear viscous liquid. If desired, the viscous liquid may be concentrated, dried to a powder form or absorbed on a carrier to obtain a free flowing powder provided this step is carried out at temperatures below 45° C. and under conditions which do not result in reaction, polymerization and/or degradation of the components. Likewise, the individual components can be converted to dry powders under conditions which are not conductive to reaction or the like and the resulting dry components mixed to obtain compositions in the form of powders, crystals or the like.

Water soluble polyacrylamide can be prepared by aqueous phase, redox-catalyzed polymerization of acrylamide. It can be prepared by other procedures provided such procedures do not result in hydrolysis of amide groups, crosslinkage of polymer chains, polymer degradation or the like. The procedure described in the examples below can be employed to produce useful aqueous polyacrylamide solutions. Since water soluble polyacrylamide tends to form very viscous syrups or gels when dissolved in water at concentrations above 10% by weight, it is usually desirable to prepare and use aqueous polyacrylamide solutions containing 10% or less solids so that the solutions are less viscous and are more convenient to handle and use. When desired, polyacrylamide in the form of dry powders, crystals or the like can be prepared and used provided that such compositions have properties comparable to those obtained with the solutions described in the examples below.

Aminoplast resins useful in the present invention are readily soluble in water and are completely stable in water. These aminoplast resins are either (1) the reaction product of about one mole of dicyandiamide, about three moles of formauldehyde and from about 0.5 mole to about one mole of urea per dicyandiamide or (2) the reaction product of about 0.9 mole of dicyandiamide, about 0.1 mole of melamine, about three moles of formaldehyde and from about 0.5 mole to about one mole of urea per mole of the dicyandiamide and melamine mixture.

The aminoplast resins are prepared by mixing (a) dicyandiamide and formaldehyde or (b) dicyandiamide, melamine and formaldehyde in an aqueous medium with a catalytic amount of an acid catalyst such as a saturated aliphatic water soluble mono- or poly-carboxylic acid or a saturated water soluble hydroxy mono- or poly-carboxylic acid or mixtures thereof.

Formaldehyde is usually employed in the form of a 37% by weight aqueous solution. When a 37% by weight aqueous solution of formaldehyde is used, the solution supplies sufficient water to provide an aqueous medium and additional water is not required. However, formaldehyde can be used in other forms such as compounds which liberate formaldehyde or as polymeric forms of formaldehyde such as paraformaldehyde, trioxane or the like. Where such forms of formaldehyde are used, they are dissolved in sufficient water to provide a 37% active solution and the resulting solution is used in lieu of formaldehyde. The term formaldehyde as used in this specification includes formaldehyde, polymeric forms of formaldehyde and compounds which liberate formaldehyde.

Low molecular water soluble carboxylic acids are suitable for use as acid catalysts. Saturated aliphatic water soluble mono- or poly-carboxylic acids and water soluble hydroxy mono- or poly-carboxylic acids can be used as catalysts. One may use water soluble carboxylic acids such as formic acid, acetic acid, propionic acid, butyric acid, oxalic acid, malonic acid, glutaric acid, citric acid, lactic acid. glycolic acid or their mixtures. These acids are used to maintain the mixture at an acidic pH during the process so that the condensation of formaldehyde with either dicyandiamide or the dicyandiamide-melamine mixture is acid catalyzed. By acidic pH is meant a pH below 7.0. Usually sufficient carboxylic acid is added to adjust the pH to about 1.5 to about 2.5 initially. The pH increases during the condensation with formaldehyde but usually does not rise above a pH of 7.0. Care must be taken that the pH does not exceed 7.0. If the pH does exceed 7.0, additional carboxylic acid must be added to reduce the pH to below 7.0 and preferably below 6.5 or lower. Usually from about 0.125 mole to about 0.25 mole of carboxylic acid per mole of dicyandiamide or dicyandiamide-melamine mixture is sufficient to maintain the pH below 7.0.

The acid catalyzed mixture is then heated to about 55° C. to about 60° C. to initiate condensation of the formaldehyde with either dicyandiamide or the dicyandiamide-melamine mixture. An exothermic reaction occurs at this point. The temperature is allowed to rise during the exothermic reaction to the temperature at which reflux occurs. The temperature rise during the exothermic reaction can be controlled by intermittent cooling if desired.

The mixture is then refluxed for about one hour to about six hours to complete the condensation. The resulting condensation product is then cooled, e.g., about 90° C. to about 75° C. From about 0.5 mole to about one mole of urea per mole of dicyandiamide or dicyandiamide-melamine mixture is then added to the condensation product and the condensate reheated to reflux temperature. The condensate is refluxed for about ten to sixty minutes to obtain the reaction product. The resulting reaction product is then cooled to about 40° C. and is stabilized by the addition of methanol, or other water soluble alcohols. The amount of alcohol which is added to stabilize the aminoplast resin is usually from about 5% to about 10% by weight of the aminoplast resin solution. The stabilized aminoplast resin can then be stored at temperatures below about 40° C. or used directly in the preparation of the compositions of this invention.

The compositions are prepared by mixing the polyacrylamide and aminoplast resin until a uniform mixture is obtained. The physical nature of the components will determine the type of mixing equipment used. If the components are liquids, they can be mixed in equipment of the type used for mixing liquids such as a kettle equipped with an agitator or with a circulating pump. If desired, additives such as viscosity reductants, stabilizers, anti-freezes or the like can be added to the compositions to improve physical properties such viscosity, freezing points, cloud points and the like provided the additives do not adversely affect flocculating properties and other useful properties. Useful additives include alcohols such as methanol, ethanol, i-propanol, n-butanol and the like; glycols such as ethylene glycol, propylene glycol and the like. The liquids are mixed at temperatures above the freezing point of the composition up to about 45° C. If the two components are solids, they can be mixed in equipment of the type used for mixing solids, such as ribbon blenders, tumblers or the like. The solids are mixed at temperatures of from about 0° C. up to about 45° C. until a uniform composition is obtained.

Evaluation of the compositions as flocculants

The compositions can be evaluated as flocculants in an aqueous system containing suspended solids such as a phosphate rock suspension, dispersion, slurry or the like. The compositions are used in the form of dilute solutions for purposes of convenience. Such dilute solutions may contain 200 p.p.m. or less of the flocculant composition based on the quantity of solids present in the composition. The dilute solution of composition is added dropwise over a given time interval to an aqueous system containing suspended solids while the aqueous system is being agitated. The resulting mixture is then agitated for a given period of time to assure uniform distribution of the composition throughout the aqueous system. The mixture is then transferred to a graduated cylinder and allowed to settle for a given time interval. A sample of supernatant liquid covering the flocculated solids is then siphoned from the graduated cylinder. The clarity of the liquid sample is determined as the percent of light transmitted through the sample relative to the percent light transmitted through distilled water. Distilled water represents 100% of light transmission so that a solution having 75% of light transmission would have a clarity of 75% of that of distilled water. The percent of light transmission relative to that of distilled water can be conveniently determined in a Lumetron Colorimeter (Photovolt Corp., New York, N.Y.) using a blue filter which gives the maximum resolution, that is, the lowest "blank" light transmission. Likewise the effectiveness of the components used in the flocculant compositions can also be determined using the individual components in the above procedure.

Evaluation of the compositions in paper making

The compositions can be evaluated in paper making in the following manner. The compositions are used in the form of dilute solutions for purposes of convenience. The dilute solution of the composition is added to the paper pulp stock and the treated stock is used to prepare handsheets. From about 0.25 part by weight to about 10 parts by weight of the composition dry is added to about 2000 parts by weight of the pulp based on the dry fiber weight. The dry strength of the resulting handsheets is then determined by the TAPPI Standard Procedure T 403-ts 63-Bursting Strength of Paper and the pigment retention of the handsheets is determined as percent ash by the TAPPI Standard Procedure T 413-ts 66-Ash in Paper as percent ash. Results obtained with handsheets prepared from the treated pulp stock are then compared with the results obtained with handsheets prepared from untreated pulp stock from the same pulp source.

For a fuller understanding of the nature and objects of this invention, reference may be made to the following examples. These examples are given merely to illustrate the present invention and are not to be construed in a limiting sense. All weights and parts by weight given in the examples are based on the weight of the particular materials used. Unless otherwise indicated, all preparations and observations were made at room temperature and all temperatures are as ° C.

EXAMPLE I

This example is directed to the preparation of a polyacrylamide solution.

48 parts by weight of water, 6.1 parts by weight of acrylamide were charged to the reactor and the mixture was heated to 55° C. under a rapid stream of nitrogen. The mixture was agitated until the acrylamide dissolved in water. Then 0.011 part by weight of potassium persulfate dissolved in 0.4 part by weight of water was added, followed by 0.77 part by weight of isopropanol. The exothermic reaction caused the temperature to rise to 65° C. The temperature was held constant at 65° C. for a period of 5 hours, then 0.056 part by weight of potassium persulfate dissolved in 0.2 part by weight of water was added and the mixture was heated to 75° C. and held at 75° C. for one hour. 6.1 parts by weight of water was added and the resulting solution of water-soluble polyacrylamide cooled to room temperature. The polyacrylamide solution obtained by this procedure contained 10% by weight of solids, was water white in color and had a voscosity of 6000 cps. when measured with a Brookfield viscometer using a #3 spindle at 12 r.p.m. The pH of a 1% solution was 7.5.

EXAMPLE II

This example is directed to the preparation of a polyacrylamide solution.

52 parts by weight of water, 6.6 parts by weight of acrylamide were mixed together and heated under a stream of nitrogen to 58° C. 0.012 part by weight of potassium persulfate dissolved in 0.38 part by weight of water was added followed by 0.828 part by weight of isopropanol. An exothermic reaction caused the temperature to rise to 65° C. The temperature was held constant at 65° C. for 7 hours. The mixture was then recatalyzed with 0.006 part by weight of potassium persulfate dissolved in 0.18 parts by weight of water. The resulting solution was heated to 75° C. and agitated for one hour. 6.7 parts by weight of water was added to the mixture to adjust the solid content to 10% by weight. The product resulting from the reaction was a water white solution of water-soluble polyacrylamide having a viscosity of 4500 cps. when measured with a Brookfield viscometer using a #3 spindle at 12 r.p.m.

EXAMPLE III

This example is directed to the preparation of an aminoplast resin solution.

336 parts by weight (4 moles) of dicyandiamide, 966 parts by weight (3 moles) of urea was added. The mix-formladehyde solution inhibited with 8% by weight of methanol, 50 parts by weight (0.5 mole) of formic acid 90% by weight active were mixed together and heated to 55° C. At this point an exothermic reaction started and was controlled by intermittent cooling until the reflux temperature of the mixture was reached. The solution was then refluxed for 5.5 hours and then cooled to 75° C. 180 parts by weight (3 moles) of urea was added. The mixture was reheated, refluxed for 30 minutes, cooled to 40° C. and then 76.5 parts by weight of methanol was added. The resulting product is a water white syrupy liquid with 48.5% by weight solid content. The product had a viscosity of 83 cps. when measured on the Brookfiield viscometer using a #2 spindle at 60 r.p.m., and had a pH of 8.2 (as is).

EXAMPLE IV

This example is directed to the preparation of an aminoplast resin solution.

5.9 parts by weight (0.072 mole) of dicyandiamide, 1.045 parts by weight (0.0083 mole) of melamine, 19.62 parts by weight (0.2455 mole) of 37% by weight aqueous formaldehyde solution, 1.616 parts by weight (0.054 mole) of methanol and 0.997 part by weight (0.0217 mole) of formic acid were mixed together and agitated for 30 minutes. The mixture was heated slowly to 60° C. An exothermic reaction occurred at this point and caused the temperature to rise to 96° C. The solution was refluxed for one hour, cooled to 90° C., then 3.66 parts by weight (0.061 mole) of urea was added. The mixture was refluxed for 10 minutes and then cooled rapidly to 40° C. 3.565 parts by weight (0.119 mole) of methanol was added and the solution cooled to room temperature. The resulting product contained 45% by weight solids, was white in color with a blue opalescense and was clearly soluble in cold water. The solution had a viscosity of 70 cps. when measured with a Brookfield viscometer using #2 spindle at 60 r.p.m. The pH of a 10% solution was 7.2.

EXAMPLE V

This example is directed to the preparation of an aminoplast resin-polyacrylamide composition which is within the scope of the present invention.

61 parts by weight of the polyacrylamide solution obtained in Example I above, 35 parts by weight of the aminoplast resin solution obtained in Example IV above and 4 parts by weight of n-butanol were stirred at 25° until the mixture was uniform in appearance. The resulting mixture was an aminoplast resin-polyacrylamide composition in the form of a solution which contained about 22% (21.75%) by weight solids. The pH of a 2% by weight solids solution of the composition was 7.0 The viscosity of the compoistion was 2000 cps. when measured with a Brookfield viscometer using a #3 spindle at 30 r.p.m.

EXAMPLE VI

This example is directed to evaluation of aminoplast resin solutions, polyacrylamide solutions and aminoplast resin-polyacrylamide compositions as flocculants. The aminoplast resin solutions, polyacrylamide solutions and aminoplast resin-polyacrylamide composition described in the foregoing examples were evaluated as flocculants in an aqueous system containing phosphate rock.

(A) Aqueous system preparation

Aqueous systems containing 2.50 g. of 200 mesh phosphate rock (Bradley, Fla.) in 500 g. of distilled water were prepared. The rock was added to the distilled water and the resulting aqueous system which was a dispersion of finely divided rock particles in water was then mixed for 2 minutes using a Sterling Multimixer, Model 9B5-M (Sterling Multi Products, Inc., Sterling, Ill).

(B) Flocculant solution preparation

Each of the aminoplast resin solutions, polyacrylamide solutions and aminoplast resin- polyacrylamide compositions shown in Table I below was diluted with distilled water to obtain a solution containing 2.0% by weight solids. An aliquot of the 2.0% by weight flocculant solution was then diluted to 0.02% by weight solids with distilled water to obtain a 200 p.p.m. solution of the flocculant.

(C) Flocculant evaluation

The flocculant solutions described in part (B) above were evaluated in the aqueous systems described in part (A) above in the following manner. The 502.5 g. aqueous systems described in part (A) above were stirred at 50 to 100 r.p.m. with a 2-inch blade in Sterling Multimixer cans. 5.0 ml. portions of each of the 0.02% by weight flocculant solutions prepared in accordance with the procedure given in part (B) above were added dropwise, each to a different stirred aqueous system over a time interval of one minute or less. The resulting mixtures were then stirred for 15 minutes to uniformly disperse the flocculants in the aqueous systems. After 15 minutes of stirring, the mixtures in the cans were transferred to 500 ml. graduated cylinders and allowed to settle for 30 minutes. The flocculated rock particles settled in each of the graduates leaving a supernatant liquid layer. The top 15–20 ml. of the supernatant liquid in each of the graduates was then siphoned from the graduated cylinder. The clarity of the sample of supernatant liquid was then determined using a Model 401 Lumetron Colorimeter (Photovolt Corp., New York, N.Y.) with a No. 420 blue filter to obtain the maximum resolution, that is, the lowest "blank" light transmission. The clarity of the supernatant liquid was measured as percent light transmission, that is, the percent of light transmitted through the sample as compared to the percent light transmitted through distilled water. A sample of supernatant liquid, which has a 75% transmission, transmits 75% of the light transmitted by distilled water. Distilled water, which has a 100% transmission, transmits 100% of the light.

(D) Results

Table I below shows the results obtained with aminoplast resin solutions, polyacrylamide solutions and aminoplast resin-polyacrylamide compositions as flocculants at 2 p.p.m. in the aqueous system described in part (A) above. In Table I, the column entitled Flocculant, aminoplast resin solutions are shown as aminoplast, polyacrylamide solutions as polyacrylamide and aminoplast resin-polyacrylamide compositions as aminoplast-polyacrylamide. The column in the table designated as Source shows the example in which the preparation of the flocculant is described and in some cases describes compositions obtained by mixing aminoplast and polyacrylamide solution from specific examples at a given weight ratio. See Example VI (F) which describes a composition prepared from Example I and Example III in a 1:1 weight ratio. Example VI (J) in the table is the control, that is, the aqueous system containing suspended phosphate rock particles without flocculant. Example VI (K) is the blank, that is, distilled water without a flocculant. The column entitled Percent Transmission gives the percent of light transmited by the sample of supernatant liquid taken from the flocculated aqueous system by the procedure described above.

TABLE I.—AMINOPLAST, POLYACRYLAMIDE AND AMINOPLAST-POLYACRYLAMIDE COMPOSITIONS AS FLOCCULANTS AT 2 P.P.M. IN AN AQUEOUS SYSTEM CONTAINING PHOSPHATE ROCK

| Example VI | Flocculant | Source | Percent transmission |
|---|---|---|---|
| (A) | Aminlplast | Example III | 59 |
| (B) | do | Example IV | 51 |
| (C) | Polyacrylamide | Example I | 49 |
| (D) | do | Example II | 43 |
| (E) | Aminoplast-polyacrylamide | Example V | 70 |
| (F) | do | Example I and Example III in a 1:1 wt. ratio. | 75 |
| (G) | do | Example I and Example IV in a 1:1 wt. ratio. | 89 |
| (H) | do | Example II and Example III in a 2:1 wt. ratio. | 84 |
| (I) | do | Example II and Example III in a 1:2 wt. ratio. | 85 |
| (J) | Control | Aqueous system containing phosphate rock without flocculant. | 39 |
| (K) | Blank | Distilled water without flocculant. | 100 |

The data in Table I show that aminoplast-polyacrylamide compositions of Example VI (E) through VI (I) were more effective flocculants than either the aminoplast components of Example VI (A) through VI (B) or the polyacrylamide components of Example VI (C) through VI (D) and that the compositions were synergistic mixtures. Further, the composition of Example VI (F), which gave 75% transmission at 2 p.p.m. in the above test, gave 86% transmission at 4 p.p.m. in the same test.

Amino bases as well as amino base-polyacrylamide compositions were also evaluated as flocculants at 2 p.p.m. using the above test. Urea gave 40% transmission; polyacrylamide gave 41% transmission and a composition containing equal parts by weight of urea and polyacrylamide gave 42% transmission at 2 p.p.m. Likewise, dicyandiamide gave 42% transmission and a composition containing equal parts by weight of dicyandiamide and polyacrylamide gave 42% transmission at 2 p.p.m. Melamine gave 39% transmission and a composition containing equal parts by weight of melamine and polyacrylamide gave 42% transmission. These tests demonstrated that the amino bases used in the preparation of aminoplast components of the compositions of the present invention were not effective as flocculants. Further, the tests showed that these amino bases did not produce synergistic mixtures with polyacrylamide which were effective as flocculants.

EXAMPLE VII

This example is directed to evaluation of an aminoplast resin-polyacrylamide composition of the present invention in paper making.

A set of three paper handsheets (8" x 8") was prepared using a pulp having a Canadian Freeness of about 400 and a pH of 4.5 and containing 3.0% alum dry on dry fiber weight. The dry strength of the handsheets was determined by the TAPPI Standard Procedure T 403-ts 63-Bursting Strength of Paper. The three handsheets gave individual Bursting Strengths of 33.0 p.s.i., 34.5 p.s.i. and 35.1 p.s.i., respectively, and an average Bursting Strength of 34.2 p.s.i.

A second set of three paper handsheets (8" x 8") was then prepared using a pulp having a Canadian Freeness of about 400 and containing 3.0% alum dry on dry fiber weight and 9 lbs. of the composition of Example V per ton of pulp dry on dry fiber weight. Pulp from the same source was used in the preparation of both sets of handsheets. The dry strength of the second set of handsheets was also determined by the TAPPI Standard Procedure T 403-ts 63-Bursting Strength Paper. The three handsheets in the second set gave individual Bursting Strengths of 40.6 p.s.i., 42.9 p.s.i. and 39.5 p.s.i., respectively, and an average Bursting Strength of 41.0 p.s.i.

The above tests demonstrate that the aminoplast resin-polyacrylamide compositions of the present invention improve the Bursting Strength of paper when used in pulps in paper making processes.

EXAMPLE VIII

This example is directed to evaluation of an aminoplast resin-polyacrylamide composition of the present invention in paper making.

A set of three paper handsheets (8" x 8") were prepared using a pulp having a Canadian Freeness of about 400 and a pH of 4.2 and containing 0.5% alum dry on dry fiber weight and 6% titanium dioxide dry on dry fiber weight. The dry strengths of the handsheets was determined by the TAPPI Standard Procedure T 403-ts 63-Bursting Strength of Paper and the percent ash in the handsheets was determined by the TAPPI Standard Procedure T 413-ts 66-Ash in Paper as percent ash. Results of these tests with these three handsheets are shown in Table II below and are designated as Blank.

A second set of three paper handsheets (8" x 8") were then prepared using a pulp having a Canadian Freeness of about 400 and a pH of 4.3 and containing 0.5% alum dry on dry fiber weight, 6% titanium dioxide dry on dry fiber weight and 1 lb. of the composition of Example V per ton pulp dry on dry fiber weight. Pulp from the same source was used in the preparation of both sets of handsheets. The dry strength of the second set of handsheets was also determined by the TAPPI Standard Procedure T 403-ts 63-Bursting Strength of Paper and the percent ash was determined by the TAPPI Standard Procedure T 413-ts 66-Ash in Paper as percent ash. Results of these tests are shown in Table II below and are designated as Composition of Example V.

TABLE II

| Type of handsheets | Bursting strength, p.s.i. | Average bursting strength, p.s.i. | Percent ash | Average percent ash |
|---|---|---|---|---|
| Blank | 34.6 | 34.0 | 2.65 | 2.76 |
|  | 35.8 |  | 2.69 |  |
|  | 31.6 |  | 2.94 |  |
| Composition of Example V. | 34.6 | 35.3 | 3.44 | 3.51 |
|  | 36.2 |  | 3.46 |  |
|  | 35.6 |  | 3.62 |  |

The data in the table demonstrate that the aminoplast resin-polyacrylamide compositions of this invention improve the Bursting Strength and percent ash when used in pulps in paper making process. The percent ash is a pigment retention, that is, the higher the percent of ash in the paper the greater the pigment (titanium dioxide) retention in the paper.

What is claimed is:
1. A process of paper making comprising adding from about 0.25 part to about 10 parts by weight of a composition to about 2000 parts by weight of paper pulp and thereafter converting said pulp to paper, said composition comprising a mixture of
   (A) from about one part by weight to about nine parts by weight of water soluble polyacrylamide, and
   (B) from about one part by weight to about nine parts by weight of a water soluble aminoplast resin selected from the group consisting of
      (1) the reaction product of about one mole of dicyandiamide, about three moles of formaldehyde and from about 0.5 mole to about one mole of urea per mole of said dicyandiamide produced by
         (a) mixing said dicyandiamide and formal- dehyde in aqueous medium with a catalytic amount of an acid catalyst selected from group consisting of saturated aliphatic water soluble mono- and poly-carboxylic acids and water soluble hydroxy mono- and poly-carboxylic acids and mixtures thereof, (b) condensing said dicyandiamide and formaldehyde at about reflux temperature, (c) reacting the resulting product of (b) with said urea at about reflux temperature, (d) cooling the resulting reaction product of (c) to about 40° C., and (e) stabilizing said reaction product of (c) at about 40° C. with methanol, and (2) the reaction product of about 0.9 mole of dicytndiamide, about 0.1 mole of melamine, about three moles of formaldehyde and from about 0.5 mole to about one mole of urea per mole of said dicyandiamide and melamine produced by (a) mixing said dicyandiamide, melamine and formaldehyde in aqueous medium with a catalytic amount of an acid catalyst selected from the group consisting of saturated aliphatic water soluble mono- and poly-carboxylic acids and water soluble hydroxy mono- and poly-carboxylic acids and mixtures thereof, (b) condensing said dicyandiamide, melamine and formaldehyde at about reflux temperature, (c) reacting the resulting product of (b) with said urea at about reflux temperature, (d) cooling the reaction product of (c) at about 40° C., and (e) stabilizing said reaction product of (c) at about 40° C. with methanol.

2. The process of claim 1 wherein said composition comprises about one part by weight of said polyacrylamide and about two parts by weight of said aminoplast resin.

3. Paper produced by the process of claim 1.

References Cited

UNITED STATES PATENTS

| | | | |
|---|---|---|---|
| 2,765,229 | 10/1956 | McLaughlin | 260—851 |
| 2,862,901 | 12/1958 | Suen et al. | 260—856 |
| 2,918,386 | 12/1959 | Wooding | 260—851 |
| 2,990,397 | 6/1961 | Fetscher et al. | 260—29.4 |
| 3,342,786 | 9/1967 | Emmons | 260—851 |

MURRAY TILLMAN, Primary Examiner

JOHN C. BLEUTGE, Assistant Examiner

U.S. Cl. X.R.

162—168; 209—5; 210—54; 252—182; 260—29.4, 851, 856, 67.6, 69